United States Patent [19]

Boffe et al.

[11] 3,807,980

[45] Apr. 30, 1974

[54] DIFFUSION METHODS AND TREATING MEDIUMS FOR IMPROVING THE PROPERTIES OF MATERIALS

[76] Inventors: Maurice Boffe, Route de Gosselies 15, Fleurus; Francois Toussaint, Rue Terry Mouchon 101, Lodelinsart, both of Belgium

[22] Filed: Dec. 13, 1971

[21] Appl. No.: 207,589

Related U.S. Application Data

[62] Continuation-in-part of Ser. No. 722,380, Apr. 18, 1968.

[30] Foreign Application Priority Data

Apr. 24, 1967 Luxembourg .......................... 53499
Dec. 22, 1967 Great Britain ..................... 58384/67

[52] U.S. Cl. .................................................. 65/30
[51] Int. Cl. ........................................... C03c 21/00
[58] Field of Search ....... 65/30, 99 A; 204/130, 180

[56] References Cited
UNITED STATES PATENTS 3,313,644   4/1967   Morrissey ......................... 65/30 X
3,529,946   9/1970   Fischer et al. ......................... 65/30
3,356,477   12/1967  Chisholm et al. ...................... 65/30
3,287,200   11/1966  Hess et al. ......................... 65/30 X

FOREIGN PATENTS OR APPLICATIONS 917,388   2/1963   Great Britain ......................... 65/30

*Primary Examiner*—S. Leon Bashore
*Assistant Examiner*—Kenneth M. Schor
*Attorney, Agent, or Firm*—Spencer & Kaye

[57] ABSTRACT

In processes wherein at least one property of a glass, vitrocrystalline or stone material is improved by the diffusion of a substance into the material from a medium communicating with the material, a method for substantially improving the diffusiom process by including in the medium at least one material which has the effect of weakening the diffusion barrier at the interface between the material and the medium with respect to the substance to be diffused into the material.

12 Claims, No Drawings

DIFFUSION METHODS AND TREATING MEDIUMS FOR IMPROVING THE PROPERTIES OF MATERIALS

CROSS-REFERENCE TO RELATED APPLICATION

The present application is a divisional application of Ser. No. 722,380 filed Apr. 18, 1968 now U.S. Pat. No. 3,627,491.

BACKGROUND OF THE INVENTION

The present invention relates to processes for modifying a physical and/or chemical property of glass, vitrocrystalline materials and stone by the diffusion in of at least one substance from a medium communicating with the material, and particularly to a method for substantially increasing the rate of such diffusion processes. The invention also relates to materials produced by such processes.

It is well known that glass can be tempered, i.e., compressive stresses can be produced, or existing compressive stresses can be increased, in one or more surface layers of the glass, by creating an ion exchange between such surface layers and a communicating medium, provided that the nature of the ions entering the glass and the temperature condition prevailing during the ion exchange are appropriately selected.

The chemical tempering process can be of two types. According to one type of process, the ion exchange is performed at a temperature which is sufficiently high to cause stress relaxation to occur in the glass, while the ions entering the glass are such as to impart a lower coefficient of thermal expansion to the glass surface layers. According to the other type of process, ions already in the glass surface layers are replaced by larger ions and the ion exchange is effected at a temperature below the glass annealing point (which point corresponds to a viscosity of $10^{13.2}$ poises) so that stress relaxation does not occur to any substantial degree.

It has been found that during the chemical tempering of glass by means of the known ion exchange processes, the diffusion of ions into the glass from the contacting medium is hindered by the presence of substituted ion which enter the medium from the glass. During the course of experiments with many known chemical tempering processes, it was discovered that diffusion was stopped almost completely by the presence of substituted ions in the medium even when the substituted ion concentration was quite low, with the result that the degree of strengthening which could be imparted to the glass was also quite low.

SUMMARY OF THE INVENTION

It is a primary object of the present invention to overcome these drawbacks and difficulties.

Another object of the invention is to substantially improve the chemical tempering of glass and other materials.

A further object of the invention is to increase the quantity of ions which can diffuse from a medium into the material being treated during such chemical tempering process.

Yet a further object of the invention is to substantially decrease the diffusion barrier existing at the interface between the material being treated and the treating medium in contact with the material.

Still another object of the invention is to increase the diffusion coefficient of the ions which are to diffuse into the material.

We have discovered that these results can be achieved in a particularly suitable manner by incorporating various additive substances into the treating medium which is in contact with the material and which is the source of the ions to be diffused into the material.

The above and other objects according to the present invention are achieved by certain improvements in a process for modifying at least one property of a material selected from the group consisting of glass, vitrocrystalline material and stone, by difussing at least one substance into the material from a treating medium in communication with the material. In accordance with the improvements of the invention, the process is carried out using a treating medium composed of at least one ingredient which provides the substance which diffuses into the material and at least one other ingredient which has the effect of weakening the diffusion barrier existing at the interface between the material and the medium.

Some of the additive ingredients which we have found to have the desired effect on the diffusion barrier apparently act so as to directly prevent or reduce the diffusion prohibiting action of the substituted ions entering the medium from the material being treated.

The present invention also involves compositions which are to be employed as treating media in a process for modifying at least one property of a material selected from the group consisting of glass, vitrocrystalline material and stone by diffusing at least one substance into the material. The compositions defining the treating media, which communicate with the material, include at least one ingredient which provides the substance to be diffused into the material and at least one other ingredient which has the effect of weakening the diffusion barrier existing at the interface between the material and the medium.

In addition, the invention involves a material selected from the group consisting of glass, vitrocrystalline material and stone and having at least one of its properties modified by the process of diffusing at least one substance into the material from a treating medium in communication with the material and composed of at least one ingredient which provides the substance which diffuses into the material and at least one other ingredient which has the effect of weakening the diffusion barrier existing at the interface between the material and the medium.

DESCRIPTION OF THE PREFERRED EMBODIMENTS

Broadly stated, the present invention is based on our discovery that many types of diffusion media having one ingredient which provides the substance to be diffused into the material being treated can have its effectiveness substantially increased if it is provided with an additional ingredient which provides a substance that can modify the diffusion conditons in such a way as to substantially increase the rate at which the firstmentioned substance diffuses into the material.

We have found that, for promoting the required ion exchange, it is advantageous to incorporate into the treating medium at least one substance which provides ions that show an affinity for the ions leaving the material, and particularly to incorporate substances providing ions which show a preferential affinity for ions leaving the material. When glass is to be treated, substances which give rise to the formation of complexes that include the substituted ions coming from the glass, and particularly substances selected from the group consisting of Fe, Co, Ni, $NH_4^+$, $CN^-$, are especially suitable.

Although the precise mechanism by which many of the additives employed according to the present invention achieve their desired effect is not known, the additives do have the effect of lowering, or weakening, the diffusion barrier at the interface between the material and the treating medium. This has the result of causing an increase in the quantity of ions which can diffuse into the material during a given period of time. The additives used are preferably those which have the effect of both lowering the diffusion barrier and increasing the coefficient of diffusion of the ions which diffuse into the material.

The diffusion barrier between a piece of glass and a contacting medium from which ions diffuse into the glass can be determined by measuring the electrical potential difference between an electrode placed in contact with the material and an electrode disposed in the medium at a point very close to the material surface. If an electrometer is connected to the two electrodes, its reading in millivolts will constitute a measure of the strength of the diffusion barrier.

According to an alternative technique for determining the strength of the diffusion barrier, the concentration of ions diffused from the medium to a given depth from the material surface is measured after the treatment has been completed. Such a determination can be made with the aid of an electronic probe. The lower the diffusion barrier, the greater will be the concentration of such ions at any given depth.

When the material being treated is glass, it has been found that the strength of the diffusion barrier can be reduced by the addition to the treating medium of a substance which acidifies this medium. For example, substances of this type are those which will provide $SO_4^{--}$ or $PO_4^{---}$ ions. Good results can be achieved by the addition to a molten salt medium, particularly a nitrate salt, of an acidifying substance such as $K_2Cr_2O_7$, $KPO_3$, $KBO_2$ and compounds generally providing metal ions having a valence state of 3, 4 or 5. Examples of these latter compounds are: $Al^{+3}$, $Sn^{+4}$, $Ti^{+4}$ and $Bi^{+5}$.

The range of possible acidifying substances is not limited to those which provide ions having an affinity for the ions migrating from the material, whether to form complexes therewith or otherwise. Other additive substances which have been found to weaken the diffusion barrier are substances producing halogen ions, examples of such substances being fluorine, chlorine, bromine, iodine, or compounds composed of any one of these halogens with silicon, titanium, tin, aluminum or vanadium. Compounds in the category of bromates, chlorates and iodates can also be used quite successfully, as can organic halogen compounds, such as $(CO)Cl_2$, $CCl_4$, $CH_3Br$, $C_2H_5I$. If the selected halogen or halogen compound is in a gaseous state at the treatment temperature, the element or compound can be bubbled through the molten treatment medium contacting the material.

Other substances which have been found to improve the diffusion fusion into glass are compounds which are sources of alkaline earth metal ions, such as calcium sulphate, calcium phosphate and calcium borate, for example. The most effective alkaline earth metal ions are $Ca^{++}$ and $Mg^{++}$. However, compounds of other alkaline earth metals have proved to be useful. Particular reference may be made to sulphates, phosphates, oxides and silicates of calcium, barium, magnesium and strontium. The required metal ions can be released during processing by electrolytic dissolution.

It has also been found to be advantageous, in some cases, to select a diffusion-promoting compound which will produce anions of a type which are not present, or not present in appreciable quantities, in the glass being treated.

In addition, if the medium contains a compound of a type which falls into more than one of the categories mentioned above, this will normally prove to be advantageous. For example, $AlCl_3$ is more active than a compound which merely provides $Al^{+3}$ ions or which merely provides $Cl^-$ ions.

In some cases, the diffusion of ions of a given element from the treating medium into the glass material can be promoted if free atoms of the same element are present in the medium. In order to understand this effect, it is necessary to first recall that the diffusion of monovalent ions into glass generally occurs more readily than does the diffusion of higher valency ions and that the diffusion of bivalent ions is normally quite slow and often only a small number of vibalent ions can be caused to diffuse into the glass. However, if the treating medium contains a quantity of the bivalent element in its free state, in addition to a compound of the element, the diffusion process will be improved. It is thought that this might be due to the fact that the valence state of the ions to be diffused into the material is modified by the presence of free atoms of the element in question.

It is already known that ion exchange can be enhanced by applying an electric field having a suitable amplitude and polarity across the diffusion barrier. It has been found that when such an electric field is utilized, the diffusion of given types of ions into the material is further promoted if the medium contains other ions which create preferential diffusion channels in the material. For example, a sheet of glass can be disposed with one face in contact with a quantity of molten salt constituting the treating medium from which ions diffuse into the glass, while the other face of the glass sheet is in contact with an electrically conductive member or a quantity of molten material, this latter quantity of molten material possibly having the same composition as the treating medium, and the diffusion of ions into glass can be accelerated by applying a direct or alternating voltage having an amplitude of several hundred volts between the masses of molten salt or between the treating medium and the electrically conductive member. The electric field causes the diffusion front to move further into the glass sheet. In such a process, the required diffusion of ions can be further increased by the presence, in the molten salt and adjacent the surface of the glass, of ions which produce preferential diffusion paths facilitating the penetration of the ions from the molten salt into the glass.

If an alternating field traverses the interface between the glass and the treating medium, which field should preferably have a frequency of at least 20 cps, the diffusion barrier will be lowered by a surprisingly large amount if the treating medium contains a sufficient quantity of ions of an element which is the same as that having ions migrating from the glass. However, in order to achieve the desired result, it is necessary that the medium have a quantity of such ions which is greater than that which would be provided by the glass during the course of the treatment process. Thus, the addition to the medium of an ingredient which will artifically increase the proportion of such ions is necessary.

During the course of a process according to the present invention, added quantities of the diffusion-promoting substances can be added at any time, for example, to make up for any evaporation losses.

As will become more readily apparent from the discussions presented below, the present invention involves processes in which the diffusion into the material of ions of a given element takes place from a medium composed of different compounds of the given element. In such cases, however, the speed and/or maximum amount of diffusion is not attributable simply to the concentration of the ions of that element. The presence of a diffusion-promoting agent is evidenced by the fact that the interfacial diffusion barrier which tends to limit the diffusion of the ions entering the material is lowered. In other words, the quantity of such ions which diffuse into the glass over a given period of time is greater than if the diffusion were to take place using a medium composed of only one of the compounds and having the same total concentration of such ions, all other conditions being equal.

Although glass has been until now primarily specified as the material being treated, primarily because the invention was developed during the course of research into the chemical tempering of that material, it should be mentioned that the invention can be usefully applied for promoting the diffusion of ions into vitroceramics or vitrocrystalline materials having any degree of crystallization, and various types of stone, such as marble for example. The techniques described above for carrying out the invention can also be applied to the treatment of such other materials. Moreover, the present invention is not limited to processes in which ion migration takes place, but also extends to "cementation" processes in which atoms or molecules are introduced into the material being treated without any migration of atoms or molecules from this material occurring. One example of processes of this type is a process wherein atoms are introduced into the surface layer of glass in order to improve its resistance to water.

Therefore, the invention can be broadly defined as encompassing any process in which a physical and/or chemical property of glass, a vitrocrystalline material or stone is modified by causing ions, atoms or molecules to diffuse into such material from a contacting medium composed of a mixture of different constituents such that at least one of the constituents provides the ions, atoms or molecules which diffuse into the material and such that, all other conditions being unchanged, the diffusion barrier at the interface between the material and the medium is weaker than it would be if the medium were to be composed entirely of the constituents providing the diffusing ions, atoms or molecules.

Several specific examples of processes according to the present invention will be given below and these examples will relate primarily to processes in which a homogeneous medium composed of molten ingredients, and primarily molten nitrates, halides and sulphates, are employed. While this represents the preferred form for such a medium, the invention as broadly defined can also be carried out using a liquid medium containing a dispersed substance, such as dispersed diffusion-promoting agent, or a gaseous medium constituted by one or more vaporized salts, or a medium having a pasty consistency and applied directly to the glass surfaces.

In the case of a suspension, the medium is preferably substantially homogenous; for example it could be a colloidal suspension and/or the medium could be one in which the substance constituting the dispersed phase becomes gradually dissolved during the course of the process.

It is one of the important advantages of the invention that the processes according thereto permit substantial improvements to be made to chemical and/or physical properties of glasses of ordinary composition, for example, ordinary soda lime glasses. A principle field of use for the invention is in the chemical tempering of glass by the exchange of alkali metal ions between the glass and a treating medium, particularly a medium in the form of a bath of molten salts in which the glass is immersed and which contains the ions that are to diffuse into the glass.

Several specific examples of processes according to the invention will now be presented below. In all of these examples, the weakening of the diffusion barrier was confirmed by comparative laboratory measurements of the electrical potential across the interface between the material being treated and the treating medium.

Example 1

A sheet of soda lime glass 2 mm in thickness and containing as its main constituents 70.4% $SiO_2$, 12.78% $Na_2O$, 12.14% $CaO$ and 1.92% $Al_2O_3$, was immersed in a bath containing $LiNO_3$ at a temperature of 580°C., i.e., at a temperature higher than the annealing point of the glass (about 550°C), and also higher than the glass strain point.

The treatment bath had the following composition by weight: 9% $LiNO_3$, 79% $Ca(NO_3)_2$ and 12% $CaCl_2$. Comparative tests have confirmed that the presence of the $CaCl_2$ compound weakens the diffusion barrier. Moreover, it appears that the chlorine ions increase the coefficient of diffusion of the lithium ions into the glass.

When diffusion into the glass, the lithium ions expel sodium ions therefrom. The diffusion of lithium ions will continue without any substantial decrease in the rate of diffusion until the concentration of sodium ions in the bath is above 5 percent, this generally occurring after the same bath has been used for treating a substantial number of sheets. In a comparative test using a bath without $CaCl_2$ as an ingredient, it was found that a sodium ion concentration of only 0.5 percent in the bath seriously slowed down the diffusion of lithium ions into the glass.

The sheet of glass is kept immersed in the treatment bath for 20 minutes at the stated temperature (580°C) and then removed from the bath and cooled in air. It was found that the sheet of glass has a breakage strength of 97 kg/mm². The strength of the same glass before the chemical tempering treatment was of the order of 7 kg/mm$^2$.

In performing processes involving the substitution of lithium ions for larger ions, the concentration of lithium ions in the bath must not be too high, otherwise the surface of the glass will deteriorate. It is preferable not to exceed a concentration of 10 percent.

Example 2

A sheet of borosilicate glass, 3 mm in thickness, having the following composition by weight: 66.78% $SiO_2$, 8.54% $B_2O_3$, 13.38% $Na_2O$, 0.30% $K_2O$, 0.40% CaO, 9.70% $Al_2O_3$, the remainder being impurities including inter alia MnO and $Fe_2O_3$, was immersed in a bath of molten potassium nitrate kept at a temperature of 450°C. The annealing temperature of the glass was 555°C. During immersion, potassium ions diffuse from the bath into the glass and sodium ions diffuse from the glass into the bath of molten salt.

The strength of the diffusion barrier can be reduced by adding $K_2S_2O_7$ to the bath in an amount such that the concentration of sulphate ions is 1.5 percent. The sulphate ions acidify the bath and their presence serves to keep the diffusion barrier substantially constant during the course of the process by preventing or reducing the diffusion inhibiting effect of the sodium ions which migrate into the bath from the glass.

The glass is kept in the bath for a period of 25 hours and then removed from the bath and cooled in air at room temperature. The breakage strength of the sheet of glass thus treated is about 110 kg/mm$^2$.

Example 3

A sheet of soda lime glass of the same composition as the soda lime glass in Example 1 was treated, under the same conditions as the borosilicate glass in Example 2, in a bath of potassium nitrate, but instead of adding $K_2S_2O_7$ to the bath, potassium pyrophosphate was added in an amount such that the bath contained phosphate ions, $PO_4^{---}$, in a concentration of 0.7 percent, the bath being thereby acidified.

Substances as used in Examples 2 and 3 for acidifying a potassium nitrate bath can likewise be used for acidifying chemical tempering baths of other compositions, e.g., for acidifying baths containing sodium ions for replacing lithium ions in the glass; baths containing rubidium for replacing potassium, sodium and/or lithium ions in the glass; and baths containing cesium for replacing rubidium, potassium, sodium and/or lithium ions in the glass.

The diffusion of ions into soda lime glass and borosilicate glass can be promoted by using baths having the compositions set forth in the foregoing Examples but using alkaline earth metal ions, preferably $Ca^{++}$ or $Mg^{++}$, in place of the diffusion promoting substances specified in those Examples. Such earth metal ions will also produce a weakening of the diffusion barrier. The concentration of such alkaline earth metal ions in the bath should preferably not exceed 2 percent and such alkaline earth metal ions can, of course, be used equally well to promote diffusion from baths having other compositions. Thus, good results have been obtained by introducing calcium ions in a concentration of 0.95 percent into a bath of cesium nitrate for the treatment of soda lime and borosilicate glasses.

Example 4

A soda lime glass having the same composition as the soda lime glass of Example 1 was treated in a bath of rubidium nitrate at 480°C in order to strengthen the glass as a result of the substitution of rubidium ions for sodium ions. $Br^-$ ions were incorporated in the bath, in a concentration not exceeding 1.5 percent, by the addition of hydrated calcium bromide ($CaBr_2 \cdot H_2O$). The bromine ions had a preferential affinity for the substituted $Na^+$ ions, which diffused into the bath, and neutralized their effect, setting up links, probably of a mixed type. As a result, the diffusion barrier was lower, and was kept more constant, than if a bath without the added hydrated calcium bromide had been used. The presence of the $Ca^{++}$ ions in the bath also played a part in neutralizing the effects of the $Na^+$ ions.

After treatment of the glass in the bath for 15 hours, the glass had a breakage strength of 120 kg/mm$^2$.

Example 5

A silico-aluminous glass having the following composition by weight: 60% $SiO_2$, 18% $Al_2O_3$, 8% CaO, 8% MgO and 6% BaO was brought into contact with a bath of calcium nitrate heated to a temperature of 600° C — i.e., a temperature lower than the annealing temperature of the glass, which is about 625° C. Substantially no diffusion of calcium ions into the glass took place. $NH_4^+$ and $PO_4^{---}$ were then introduced into the bath in a total concentration of 1.5 percent. Diffusion of calcium ions into the glass and diffusion of magnesium ions into the bath from the glass then occurred, due to a weakening of the diffusion barrier. We believe that the $NH_4^+$ and $PO_4^{---}$ ions formed with the magnesium ions complexes of the $(NH_4)_2 CaMg(PO_4)_2$ type which dissociated in the bath of molten salt into $NH_4^+$ ions and $[CaMg (PO_4)_2]^{--}$ ions and that the increase in the diffusion of the $Ca^{++}$ ion into the glass was due to the formation of such complex ion.

Substances capable of forming complexes can be used not only for promoting the diffusion of ions of bivalent elements, but also to encourage the diffusion of monovalent ions. Thus, the foregoing complex-forming ions introduced into a bath of calcium nitrate can be introduced into a bath of sodium nitrate, e.g. a sodium nitrate bath used for causing sodium ions to replace lithium ions in a lithium glass. In that case, one or more of the following types of complexes would be formed: $NH_4NaHPO_4$; $NH_4NaLiPO_4$; and $NH_4LiHPO_4$, which in the bath of molten salt are dissociated into $NH_4^+$ and $[NaHPO_4]^-$, $[NaLiPO_4]^-$ and $[LiHPO_4]^-$, respectively.

Other elements which can be introduced into the bath to form complexes are ions of Fe and $CN^-$. Complex ions of the $[FeM(CN)_5]^-$ type will then be formed with the substituted monovalent ions M which diffuse from the glass into the bath. Similar complexes can also be formed with cobalt and nickel ions. These complex ions reduce both the diffusion barrier at the interface between the bath and the glass and the diffusion inhibiting effect of the substituted monovalent ions diffusing from the glass into the bath.

The methods referred to in the foregoing Examples for promoting the diffusion of ions into glass, which methods include acidification of the bath and the formation of complexes, can be used for promoting the diffusion of ions into various vitrocrystalline material, e.g., a vitroceramic material formed by subjecting a lithium glass having a composition by weight of 54% $SiO_2$, 34% $Al_2O_3$, 10% $Li_2O$ and 2% $TiO_2$, to a heat treatment, of a type known per se, to cause the appearance of crystalline phase, formed by β-eucryptite having the formula ($Li_2OAL_2O_32SiO_2$) in an amount depending on the nature of the heat treatment, while leaving a remaining vitreous phase containing lithium ions.

Such vitrocrystalline materials have a high mechanical strength, but their strength can nevertheless be increased by subjecting them to a chemical tempering treatment in a bath of molten salt, e.g., bath containing sodium or potassium ions.

Example 6

A sheet of marble containing 90 percent by weight $CaCO_3$ was immersed in molten potassium nitrate at 450°C. Potassium ions diffused from the bath into the marble, resulting in an increase in its mechanical strength. In a comparative test, it was found that the diffusion barrier could be reduced, and the rate of diffusion of the potassium ions into the marble thereby increased, by adding 5 percent by weight of $Fe_2O_3$ powder to the potassium nitrate bath.

Example 7

A piece of ceramic measuring 50 × 50 × 20 cm and having the following composition by weight: 5% $SiO_2$; 50% $Ce_2O_3$; 20% FeO; 12% $Al_2O_3$; and 13% MgO, was immersed in a bath of molten salts comprising, by weight, 5% LiCl, 85% NaCl and 10% $LiNO_3$. The bath was maintained at 800°C. Under these conditions, lithium and sodium ions diffused into the ceramic material and became substituted for larger cerium ions, which latter diffused into the bath. In a comparative test it was found that the rate of diffusion could be significantly increased, due to weakening of the diffusion barrier, by passing chlorine gas through the molten salt bath during the treatment.

Example 8

A sheet of flat glass measuring 1 m × 1 m × 0.003 m and having the following compositon by weight: 70% $SiO_2$; 14% $Na_2O$; 13% CaO; and 3% $Al_2O_3$, was immersed in a bath of molten lead at 420°C. Under these conditions, lead atoms diffused into the glass. In a comparative test it was found that the rate of diffusion of lead into the glass could be increased by 100 percent, due to weakening of the diffusion barrier, by adding iron powder to the molten lead bath. This example illustrates a "cementation" type process wherein there is no migration of atoms from the material being treated into the adjacent medium from which the diffusion of atoms into the material takes place.

Example 9

A sheet of lithium glass having the following composition by weight: 54% $SiO_2$; 34% $Al_2O_3$; 10% $Li_2O$; and 2% $TiO_2$ was immersed in a bath of molten salts comprising, by weight, 10% KCl, 20% $RbNO_3$, 30% $KNO_3$ and 40% RbCl. The bath was maintained at 300°C. Under these conditions, the diffusion of potassium and rubidium ions into the glass in substitution for lithium ions proceeded very slowly.

In a comparative test, $FeCl_3$ and KCN were added to the bath with the result that the speed of diffusion was 10 times as great as before. The substances added to the bath resulted in the formation, with lithium ions diffusion from the glass, of a complex ion which may be $[FeLi(Cn)_5]^-$.

Example 10

A sheet of glass of the same composition as that used in Example 11 was contacted by a vapor mixture containing, by weight, 50% $H_2O$, 40% $H_2SO_4$ and 10% HF, the vapor atmosphere being at a temperature of 650°C. Under these conditions, hydrogen ions diffused into the glass, with an effect on the glass analogous to that which results from the diffusion of lithium ions into a sodium glass.

In a comparative test, the rate of diffusion was significantly increased by the addition to the atmosphere of a quantity of oxygen such that the oxygen partial pressure was 1/100 the total vapor pressure.

Example 11

A sheet of glass of the same composition as that used in Example 9 was covered on one face with a paste-like mass comprising, by weight: 50 percent graphite; 20% Na; 20% NaCl; 5% $KNO_3$; and 5% $CaCl_2$. At 300°C, ion exchange proceeded quite rapidly between the glass and the coating. The rate of diffusion was found to be about five times the rate of diffusion which occurred in a comparative test wherein the same conditions prevailed with the exception that the medium coating the glass included only graphite sodium, sodium chloride and potassium nitrate.

It will be understood that the above description of the present invention is susceptible to various modification, changes and adaptations, and the same are intended to be comprehended within the meaning and range of equivalents of the appended claims.

We claim:

1. In a process for modifying at least one property of a material, selected from the group consisting of glass and vitrocrystalline material, by diffusion of at least one substance into the material from a treating medium in contact with the material and through an interfacial diffusion barrier between the material and the medium and wherein:

a. the material initially contains exchangeable ions, and b. the composition of the material and that of the medium are such that, during the process, ions from the medium diffuse into the material and ions from the material diffuse into the medium, the resulting ion exchange producing or increasing compressive stresses in at least one surface layer of the material, the improvement wherein the treating medium comprises at least one ingredient which provides the substance and at least one other ingredient which increases the diffusion rate, the concentration of the other ingredient in the medium being sufficient to increase the diffusion rate; the ingredient which increases the diffusion rate being a source of a combination of a cation selected from the group consisting of an ion of Fe, of an ion of Co, of an ion of Ni and of an $NH_4^+$ ion with an anion selected from the group consisting of $PO_4^{---}$ and $CN^-$; and the substance being composed of an ion of an alkali metal having an atomic number of at least 11 or $Ca^{++}$.

2. A process as defined in claim 1 wherein the material is a glass.

3. A process as defined in claim 2 wherein the glass is an ordinary soda lime glass.

4. A process as defined in claim 2 wherein the glass is a borosilicate glass.

5. A process as defined in claim 2 wherein the glass is a silico-alumina glass.

6. A process as defined in claim 1 wherein the medium is essentially homogeneous and is composed of molten ingredients.

7. A method as defined in claim 1 wherein the step of diffusion causes ions to diffuse from the material into the medium and wherein the other ingredient is a compound which provides ions having an affinity for the ions diffusing out of the material.

8. A process as defined in claim 7 wherein the other ingredient provides a substance for forming complexes with the ions diffusing out of the material.

9. A process according to claim 1 wherein the cation is an ion of Fe.

10. A process according to claim 1 wherein the cation is an ion of Co.

11. A process according to claim 1 wherein the cation is an ion of Ni.

12. A process according to claim 1 wherein the cation is $NH_4^+$.

* * * * *

UNITED STATES PATENT OFFICE
CERTIFICATE OF CORRECTION

Patent No. 3,807,980                    Dated April 30, 1974

Inventor(s) Maurice Boffe and Francois Toussaint

It is certified that error appears in the above-identified patent and that said Letters Patent are hereby corrected as shown below:

In the heading of the patent, after line 7, insert
--[73] Assignee: GLAVERBEL S.A., Watermael-Boitsfort, Belgium--;
line 11, change "Continuation-in-part" to --Division--.
In the Abstract, line 5, change "diffusiom" to --diffusion--;
after line 9, insert --The diffusion barrier weakener is a material selected from the group consisting of an ion of Fe, Co, Ni, and $NH_4^+$ with an anion of either the phosphate or the cyanide radical.-- Column 1, line 44, change "ion" to --ions--.
Column 9, line 6, change "$(Li_2OAL_2O_32SiO_2)$ to --$(Li_2Al_2O_32SiO_2)$-

Signed and Sealed this twenty-ninth Day of July 1975

[SEAL]

Attest:

RUTH C. MASON  
*Attesting Officer*

C. MARSHALL DANN  
*Commissioner of Patents and Trademarks*